Sept. 2, 1930.  M. LOUGHEAD  1,774,985
ADJUSTABLE BRAKE SHOE STOP
Filed Aug. 18, 1928
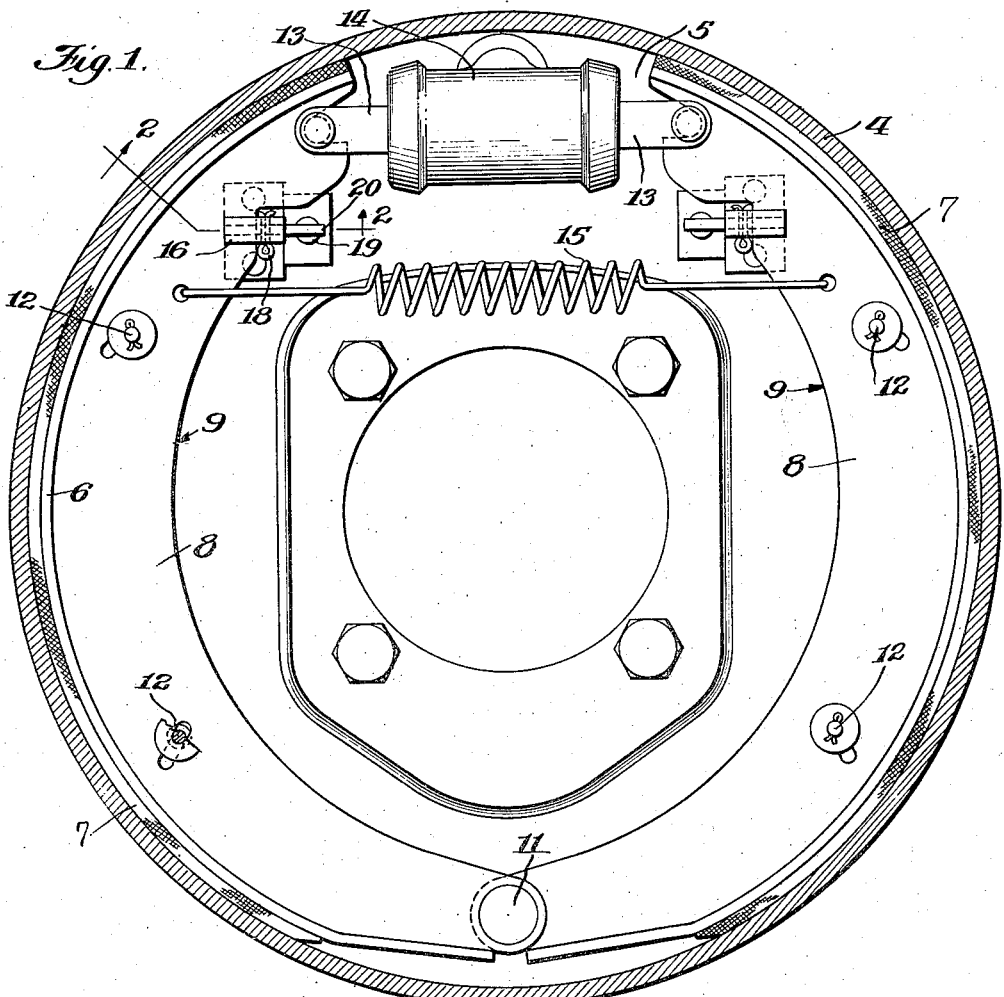
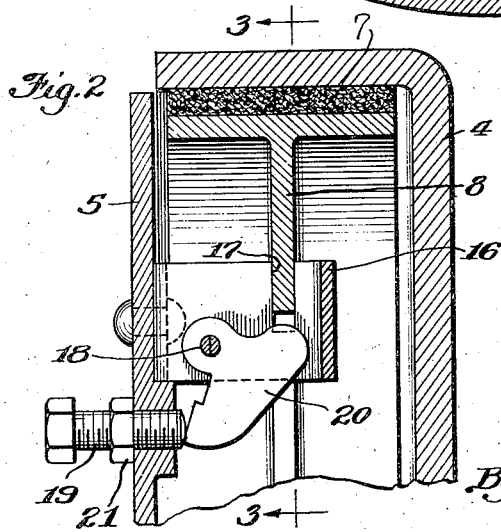
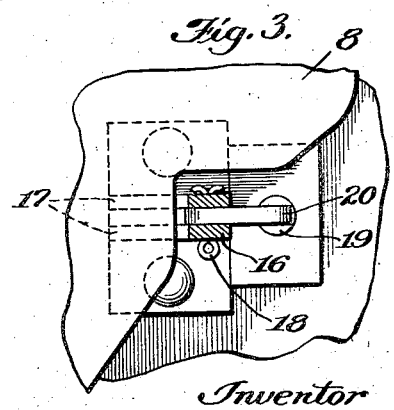

Patented Sept. 2, 1930

1,774,985

UNITED STATES PATENT OFFICE

MALCOLM LOUGHEAD, OF DETROIT, MICHIGAN, ASSIGNOR TO HYDRAULIC BRAKE COMPANY, OF DETROIT, MICHIGAN, A CORPORATION OF CALIFORNIA

ADJUSTABLE BRAKE-SHOE STOP

Application filed August 18, 1928. Serial No. 300,420.

This invention relates to a braking apparatus and is herein shown and described as applied to automobiles and particularly to braking apparatus of the fluid pressure operated type.

The principal feature of the invention resides in means for limiting the retractile movement of brake shoes to compensate for wear of the brake surfaces so that the brake operating mechanism retracts through substantially the same distance as when the braking surfaces are in their initial condition; that is, means are provided for adjusting a brake shoe stop so that the brake shoe is retracted the same amount after it has become worn as when it is new.

An object of this invention is to provide an adjustable stop for the brake shoes which may be adjusted withoot disassembling the brake mechanism.

A further object of the invention is to provide an adjustable stop mechanism which may be adjusted by means of a set screw conveniently located in an accessible portion of the brake housing.

It is believed that a complete understanding of the invention may be had by reference to the following description taken in conjunction with the accompanying drawing, in which Fig. 1 is a front elevation, partly in section, of a brake assembly embodying the invention;

Fig. 2 is a cross-sectional view of the apparatus taken on lines 2—2 of Fig. 1; and Fig. 3 is a fragmentary sectional view taken on lines 3—3 of Fig. 2.

Referring to the drawing, the invention is illustrated in connection with a hydraulic brake of the internal type in which a drum 4, which is attached to the vehicle wheel or other rotatable member, not shown, surrounds the operating parts of the brake mechanism, which are mounted upon a pan 5. A pair of brake shoes 9, each comprising an arcuate section 6, which is provided with a brake lining 7 and an inwardly projecting flange 8 is pivotally mounted upon an anchor pin 11 attached to the lower portion of the pan 5. A plurality of shouldered guide and spacer pins 12 carried by the pan project through slots in the flanges 8 to guide the movement of the brake shoes and hold them in properly spaced relation with the pan to prevent the heavy rims of the shoes from rattling against the pan. The brake shoes are engaged with the drum 4 by a pair of fluid pressure operated pistons 13, which are actuated by the fluid pressure within the cylinder 14, and upon the reduction of the fluid pressure in the cylinder 14 the brake shoes are returned to their normal inoperative position by a spring 15.

A stop mechanism is provided to limit the retractile movement of the brake shoes so that as the lining becomes worn and a greater movement of the brake shoes toward the drum is required, the retractile movement can be correspondingly decreased so as to maintain a constant clearance between the brake shoes and the drum when the brake shoes are in their inoperative position, resulting in a uniform stroke of the pistons of the fluid motor.

The stop mechanism comprises a U-shaped member 16 which is attached to the pan 5 and has a slot 17 in each arm for receiving the flange 8 of the brake shoe. Pivotally mounted within the U-shaped member 16 upon a pin 18 is a bell crank lever 20 forming a stop member, one arm of which extends to the base of the slots 17 and into the path of the flange 8 and the other arm of which rests upon a set screw 19 which is threaded through the pan 5. A lock nut 21 is associated with the set screw 19 to securely lock it against rotation when the stop member 20 has been adjusted. As the brake lining becomes worn and the shoe 9 approaches nearer the drum 4, the set screw 19, the head of which extends outside of the housing formed by the pan 5 and the drum 4, may be rotated to pivot the stop member 20 about the pin 18, causing the arm of the stop member 20 to follow the flange 8 of the shoe 9 and thus decrease the retractile movement of the shoe.

The invention thus provides a simple and convenient means for adjusting the amount of movement of the brake shoes of a brake mechanism of the internal brake type without the necessity of removing the vehicle wheel or disassembling the brake mechanism which is necessary in many types of stop mechanisms. All that is required to adjust the stop mechanism of this invention is to adjust a set screw accessibly located on the exterior of the brake housing.

It will be understood that the invention herein described and illustrated is merely a convenient and useful form of the invention, which is capable of many other modifications without departing from the spirit and scope of the invention.

What I claim is:

1. In a brake mechanism, a brake shoe having an inwardly projecting flange, a support for the brake shoe, a U-shaped member mounted on the support and having a slot for receiving the flange of the brake shoe, and an adjustable stop member mounted in the U-shaped member for limiting the movement of the flange in the slot.

2. In a brake mechanism, a brake shoe having an inwardly projecting flange, a support for the brake shoe, a U-shaped member mounted on the support and having a slot for receiving the flange of the brake shoe, a stop member pivotally mounted in the U-shaped member for limiting the movement of the flange in the slot, and a set screw threaded into the support operable to position the stop member to determine the stop position of the brake shoe.

3. In a brake mechanism, a brake drum, a relatively stationary support forming a housing with the drum, a brake shoe pivoted for movement on said support and adapted to move parallel thereto, a member mounted on said support and adapted to guide said brake shoe in movement about its pivot, a stop movably carried by said member, and adjustable means contacting with said stop and extending through said support to permit adjustment of said stop from outside the brake housing.

4. In a brake mechanism, a brake drum, a relatively stationary support forming a housing with the drum, a brake element movably carried by the support and adapted to move into contact with said drum, a U-shaped member mounted on the support, a bell crank lever pivotally mounted in said U-shaped member and protected thereby, one arm of said bell crank lever abutting a portion of the brake shoe and constituting a stop therefor, and adjustable means abutting the other arm of said bell crank lever and extending through said support to permit adjustment of the stop position of the brake shoe from outside of the brake housing.

5. In a vehicle brake, a brake drum, a relatively stationary support forming a brake shoe housing with the drum, a brake shoe pivotally mounted on said support for movement into and out of contact with said drum, a bell crank lever carried by the support and pivoted for movement on an axis perpendicular to the brake shoe pivot, one arm of the bell crank lever abutting a portion of the brake shoe and constituting a stop therefor, and a threaded member extending through the housing in a direction perpendicular to both of said pivots and abutting the other arm of the bell crank lever, said threaded member adjustable from outside the brake housing whereby the stop position of the brake shoe is readily adjustable.

In witness whereof, I hereunto subscribe my name this 14th day of August, 1928.

MALCOLM LOUGHEAD.